United States Patent [19]

Coutant

[11] 4,112,571
[45] Sep. 12, 1978

[54] KEEPER FOR IDLER ROLLS

[75] Inventor: Ralph W. Coutant, Ridgewood, N.J.

[73] Assignee: Litton Systems, Inc.

[21] Appl. No.: 781,318

[22] Filed: Mar. 25, 1977

Related U.S. Application Data

[62] Division of Ser. No. 620,771, Oct. 8, 1975, Pat. No. 4,048,207, which is a division of Ser. No. 446,009, Feb. 25, 1974, Pat. No. 3,934,711.

[51] Int. Cl.² .............................................. B23P 11/00
[52] U.S. Cl. .................................. 29/243.5; 29/243.56
[58] Field of Search .................. 29/243.5, 243.56, 267; 248/300, 201

[56] References Cited

U.S. PATENT DOCUMENTS

| | | | |
|---|---|---|---|
| 6,077 | 1/1849 | Hay | 81/98 |
| 1,421,206 | 6/1922 | Galbraith | 81/98 |
| 1,532,803 | 4/1925 | Fowler | 81/98 |
| 1,809,386 | 6/1931 | Mason | 29/243.56 |

*Primary Examiner*—James L. Jones, Jr.
*Attorney, Agent, or Firm*—Morris I. Pollack

[57] ABSTRACT

Two embodiments of a keeper for retaining the ends of a pair of idler rolls within upwardly opening apertures in a bracket having a pair of outwardly extending ears are disclosed; both embodiments are executed in a malleable metal that retains a set once it has been manipulated into locking engagement with the ears on the bracket. The first embodiment of the keeper comprises two interlocking metal members of substantially similar configuration, each member having a body with a shallow crease, a leg with an aperture defined therein depending from one end of the body, and a tab projecting from the opposite end thereof. The members are interlocked with one another by inserting the tabs into the apertures in the opposing member. The second embodiment of the keeper comprises a unitary member having a body with pivotable legs at opposite ends and depending flanges at opposite sides thereof. The legs have apertures defined therein so that the keeper can be secured in locking engagement with the ears on the bracket. A simple manual tool is employed to facilitate the installation of the second embodiment of the keeper.

11 Claims, 10 Drawing Figures

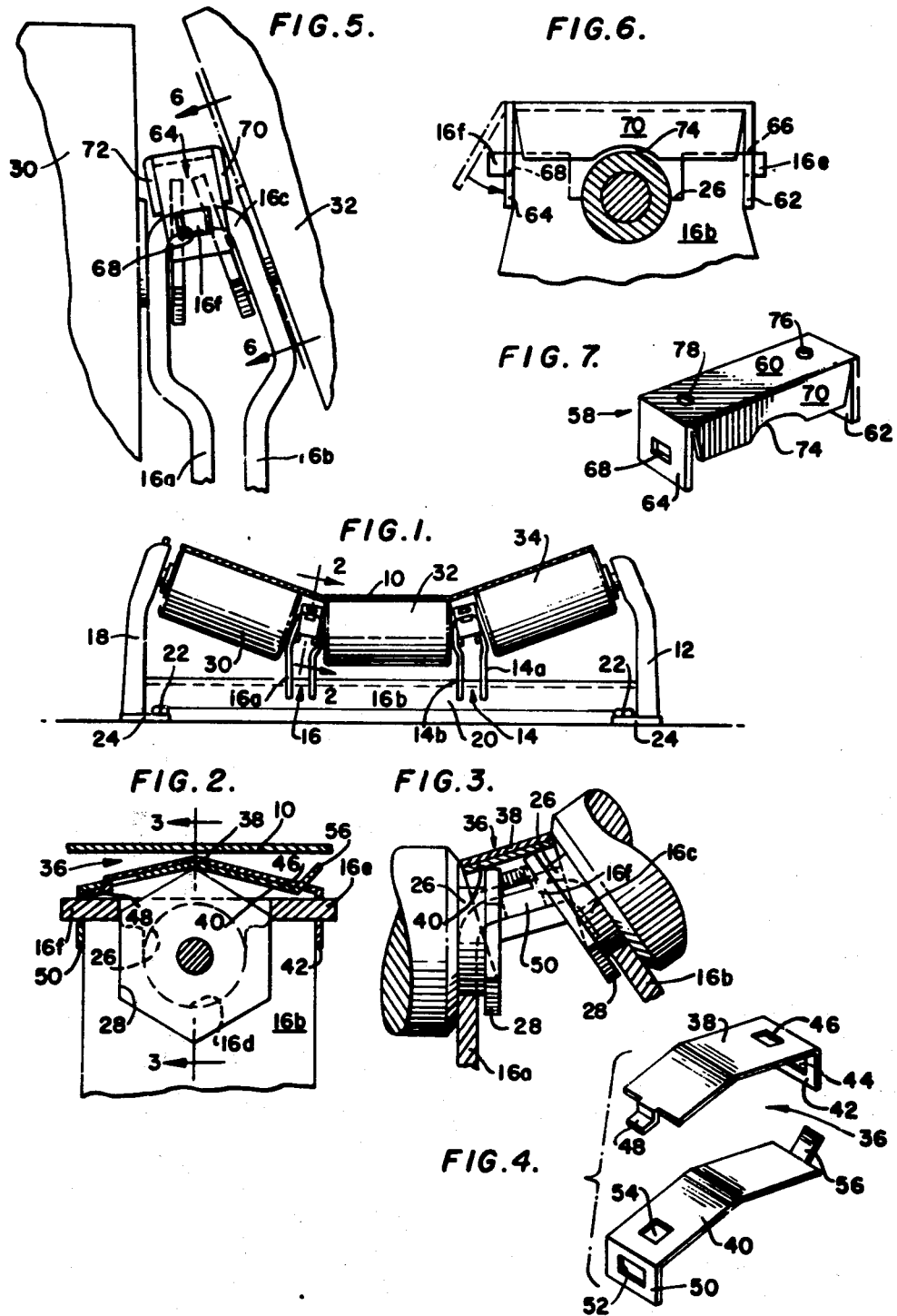

KEEPER FOR IDLER ROLLS

This is a division of application Ser. No. 620,771, filed Oct. 8, 1975, now U.S. Pat. No. 4,048,207, which is a division of application Ser. No. 446,009, filed Feb. 25, 1974, and now U.S. Pat. No. 3,934,711.

BACKGROUND OF THE INVENTION

1. Field of the Invention

The invention relates generally to keepers for idler rolls which lock the ends of a pair of adjacent rolls in fixed position within a bracket.

2. Description of the Prior Art

The desirability of providing a sturdy, inexpensive, easily insertable and removable device for retaining idler rolls in fixed position within a bracket has long been recognized. Several attempts have been made to realize these goals with varying degrees of success. One of the most common approaches has been to provide an upwardly opening U-shaped seat to receive the end of the idler roll, aligned apertures in the upper ends of the arms of the seat, and a wedge member of sufficient length to span the opening and press against the end of the idler roll. One representative wedge configuration is disclosed in U.S. Pat. No. 2,391,272, granted Dec. 18, 1945 to David Rose. The wedges, however, even when irmly driven into place, exhibit a tendency to work loose from the apertures as the idler rolls are transported to a job site.

Another common approach has been to provide a resilient spring clip that is secured to the bracket and fits over the end cap of the idler roll to capture the roll within an aperture in the bracket. One representative clip configuration is disclosed in U.S. Pat. No. 3,157,272, granted Nov. 17, 1964, to James Bay.

The strength of such resilient clips, however, which make contact with the roll over a small area is sorely limited, so that the vibrations encountered during transport of an idler roll assembly to a job site may cause the clip to spring out of locking position; at the least, the clip may be deformed and its strength and effectiveness diminished. Also, two resilient clips are required for each idler roll, i.e., one clip for each end of the roll, and the insertion of a pair of clips into the closely spaced supports of an interior bracket of an idler roll set may prove to be difficult to accomplish. Similarly, two wedges are normally utilized for each idler roll, and the accurate insertion of the wedges within the confines of an interior bracket may also prove to be a difficult task.

Another common, and probably more successful, attempt to realize the goals set forth above has been to provide a rigid sheet metal clip having a planar body and a pair of depending legs. Short, downwardly extending flanges are formed at opposite sides of the body. Ears or tabs are struck in the depending legs, and cooperating abutments are formed in the bracket proximate to its upper end. The ends of the adjacent rolls are positioned in upwardly opening apertures or slots in the sidewalls of the support posts. Then the clip is forced downwardly over the ends of the idler rolls until the ears and abutments interengage to lock the rolls in fixed position within the post. The flanges press downwardly against the idler rolls. A representative rigid clip configuration is disclosed in U.S. Pat. No. 2,843,432, granted on July 15, 1958 to A. J. Kindig.

While one rigid clip can hold a pair of rolls in fixed position, and the rigid clip is thus well suited for use with the interior brackets on an in-line, idler roll assembly, commonly used to support a troughing conveyor, the clip disclosed in the Kindig patent necessitates the modification of existing brackets to form appropriate abutments thereon, or alternatively, the manufacture of specially designed brackets having such abutments. Furthermore, the tabs struck in the depending legs are relatively small in size and limited in strength, so that upwardly directed forces caused by the vibration of the rolls during transport may shear off the tabs and permit the rolls to "bounce" out of the bracket.

SUMMARY

Thus, with the defects of known securing devices for idler rolls clearly in mind, the instant invention contemplates two embodiments of inexpensive, interlocking metal keepers that can positively retain adjacent rolls in fixed position, will not work free even during transport to the job site, and are compatible with many existing brackets. The simple metal pieces that form the keepers can be installed within limited clearances between the supports of a central bracket, and yet form sturdy keepers that effectively resist all upwardly directed forces but can be removed by simple manual tools preparatory to the replacement or repair of the idler rolls. The characteristics of the metal from which the pieces are fabricated improve significantly the performance of the two keeper embodiments.

Other desirable objectives achieved by the unique keepers will become readily apparent from the ensuing description when construed in harmony with the appended drawings.

BRIEF DESCRIPTION OF THE DRAWINGS

FIG. 1 is a front elevational view, on a reduced scale, of an idler roll set for a conveyor;

FIG. 2 is a side elevational view of a first embodiment of a keeper constructed in accordance with the principles of this invention, such view being taken along line 2—2 of FIG. 1 and in the direction indicated;

FIG. 3 is a vertical cross-sectional view of the belt, end cap, bracket and keeper of FIG. 2, such view being taken along line 3—3 of FIG. 2 and in the direction indicated;

FIG. 4 is an exploded perspective of the first embodiment of the keeper;

FIG. 5 is a front elevational view of a second embodiment of a keeper constructed in accordance with the principles of this invention;

FIG. 6 is a side elevational view of the bracket, end cap and keeper of FIG. 5, such view being taken along line 6—6 of FIG. 5 and in the direction indicated;

FIG. 7 is a persective view of the second embodiment of the keeper;

DESCRIPTION OF THE PREFERRED EMBODIMENT

Figure 8:
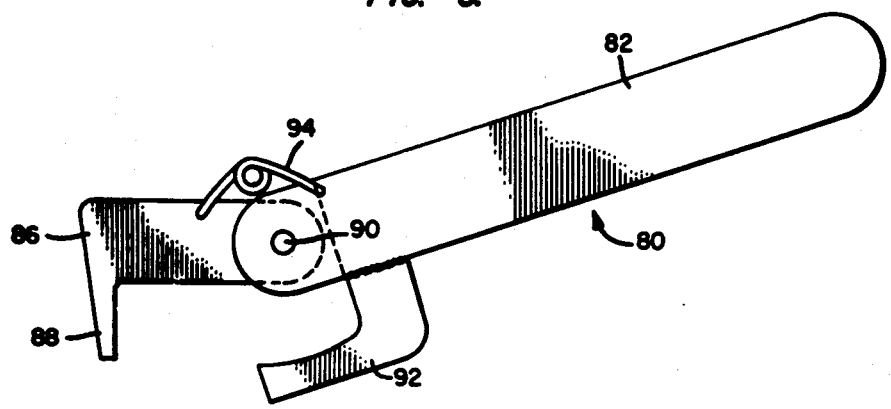
FIG. 8 is a side elevational view of a tool employed to assist in the installation of the second embodiment of the keeper.

Referring now to the drawings, FIG. 1 depicts an idler roll set within which the keepers of the instant invention find particular utility. The upper run of a conveyor 10 is entrained over the idler roll set to define a troughing conveyor. The idler roll set comprises a right end bracket 12, a first interior bracket 14, a second interior bracket 16, and a left hand end bracket 18. An angle 20 extends between the end brackets and supports the interior brackets 14 and 16. Bolts 22 passing through the longitudinal braces 24 at the base of end brackets 12 and 18 are employed to secure the idler roll set in fixed position.

Interior bracket 14 comprises a first support 14a and a second support 14b interconnected by a continuous loop (not shown). Interior bracket 16 also comprises a first support 16a, a second support 16b, and a continuous loop 16c, as also shown in FIG. 3, for support 16 is the mirror-image of support 14. The supports are angularly disposed relative to one another to accommodate rolls held at various angular orientations to achieve troughing of belt 10. As indicated by the dotted lines in FIG. 2, an upwardly opening aperture 16d is defined at the upper end of supports 16a, and 16b; a similar aperture is defined at the upper end of supports 14a and 14b. The apertures continue on to interrupt the lateral run of the loops, such as loop 16c, so that the aperture extends laterally from support to support. Laterally extending ears 16e, 16f that project outwardly from each side of the brackets 14, 16 are also visible in FIG. 2. The cooperation between such ears and both embodiments of the keeper is described hereinafter.

The dimensions of the apertures are chosen to be slightly larger than the radial dimensions of the support surfaces (see FIG. 2) of multi-purpose end caps of conventional design secured to opposite ends of a central shaft passing laterally through the idler rolls, so that the surfaces 26 can easily be inserted into the aperture and follow the contour of its walls. A hexagonal collar 28 is situated on each end cap so that the idler roll cannot be forced laterally out of the apertures within which surfaces 26 are seated.

One end of a first canted idler roll, or wing roll, 30 is seated in an aperture in end bracket 18 and the opposite end is seated in an aperture in support 16a of interior bracket 16. The outer end of roll 30 is secured in position in a conventional fashion. One end of second idler roll 32, which extends laterally between the wing rolls, is seated in an aperture in support 16b and the opposite end of roll 32 is seated in an aperture in support 14b of bracket 14. The inner end of a second canted idler roll, or wing roll, 34 is seated in an aperture in end bracket 12. Conventional means are used to secure the outer end of roll 34 within the aperture in bracket 12. Since rolls 30 and 34 are mounted at an acute angle to the plane passing laterally through roll 32, belt 10 assumes a concave configuration.

FIGS. 2–4 reveal a keeper, indicated generally by reference numeral 36, constructed in accordance with the principles of the instant invention. Keeper 36 comprises a first member 38 and a second member 40 possessing a subtantially similar configuration. First member 38 has a shallow, creased body with a depending leg 42 having a first rectangular aperture 44 formed in its central portion. A second rectangular aperture 46 of slightly smaller dimensions is formed in the body of member 38 in proximity to the juncture of the body and leg 42. A tab 48 of step-like configuration having a short vertical run and a longer horizontal run is situated at the free end of the body of member 38. The extent of the vertical run must exceed the thickness of the body of member 40.

Second member 40 has a shallow, creased body with a depending leg 50 having a first rectangular aperture 52 formed therein. A second rectangular aperture 54 of smaller dimensions is formed in the body of member 40 in proximity to the juncture of the body and leg 50. A tab 56 projects outwardly from the free end of the body of member 40.

After rolls 30, 32 and 34 have been seated in the appropriate apertures in brackets 12, 14, 16 and 18, keeper 36 is assembled in the following manner. The application of keeper 36 to bracket 16 is deemed to be exemplary. Initially, member 40 is positioned in operative relationship to the supports of each interior bracket, such as bracket 16, so that ear 16f passes through aperture 52 in leg 50. Then, tab 48 is inserted into aperture 54 so that its horizontal tongue extends under the body of member 40 and toward its juncture with leg 50. Lastly, member 38 is bent downwardly until ear 16e on bracket 16 passes through aperture 44 in leg 42 and tab 56 projects outwardly through second aperture 46 in member 38. Since the bodies of members 38 and 40 are creased at the same location, and are similarly shaped, the two members are interlocked together in an overlapping fashion which enhances the strength and effectiveness of keeper 36. The interaction of the interlocking and overlapping members 38, 40 successfully resists the upward movement of the idler rolls during transport of the idler roll set to a job site as well as during operation of the idler rolls. Additionally, keeper 36 is fabricated from a malleable metal, such as steel, that takes a set and does not exhibit any resilience characteristic in marked contrast to conventional keepers which have been fabricated as sheet metal stampings, such sheet metal being of light gauge and normally exhibiting a resilience characteristic that resists taking a set, once deformed.

DESCRIPTION OF THE ALTERNATIVE EMBODIMENT

A second embodiment of a keeper constructed in accordance with the principles of the instant invention is shown in FIGS. 5–7 and 10, such keeper being indicated generally by reference numeral 58. Keeper 58 is a unitary member comprising a body 60 having a pair of legs 62, 64, one leg disposed at each end thereof. An aperture 66 is formed in leg 62, while an identical aperture 68 is formed in leg 64. Flanges 70 and 72 extend downwardly, from opposite edges of body 60, and hemispherical cut-outs 74 are removed from the lower ends of the flanges. The flanges enable the keeper to be seated securely in locking engagement with a pair of idler rolls, even though the rolls may be canted relative to one another. Openings 76 and 78 are formed in trough body 60.

The manner in which keeper 58 is installed is clearly shown in FIG. 6. Leg 66 is bent downwardly at right angles to body 60 so that ear 16e can project through aperture 66 and lock one leg of the keeper in fixed position as indicated by the directional arrow. The cut-outs 74 follow the contour of support surface 26 on the end cap secured to the central shaft of roller 32, and the end cap is seated within the upwardly opening aperture 16d in support 16b. Lastly, leg 68 is bent downwardly from its normal attitude parallel to body 60 to a position at right angles to body 60 so that ear 16f can project through aperture 68 and lock the second leg of the keeper in fixed position. The normal attitude is shown in dotted outline in FIG. 6, while the locking position is shown in solid outline.

Figure 9:
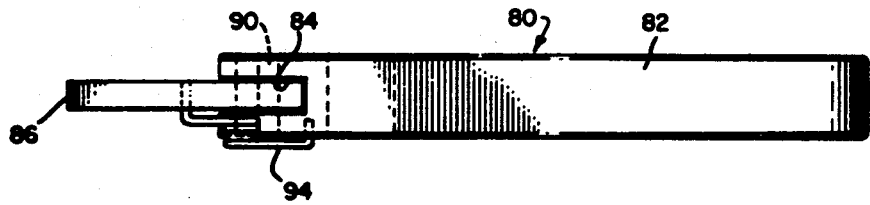
FIG. 9 is a top plan view of the tool of FIG. 8.

While keeper 58 can be installed with conventional tools, the unique tool 80, shown in FIGS. 8 and 9 has proven to be a superior implement for this purpose. Tool 80 comprises an elongated handle 82 with a U-shaped cavity 84 at its forward end; an L-shaped member including a horizontal arm 86 and a vertically extending finger 88 is secured within the cavity by pin 90. A lug 92 is joined to the handle 82 near its forward end, and a spring 94 normally maintains a predetermined angular relationship between finger 86 and lug 92. The lower end of finger 88 gradually tapers down to a size that can be inserted into openings 76, 78 in keeper 58.

Figure 10:
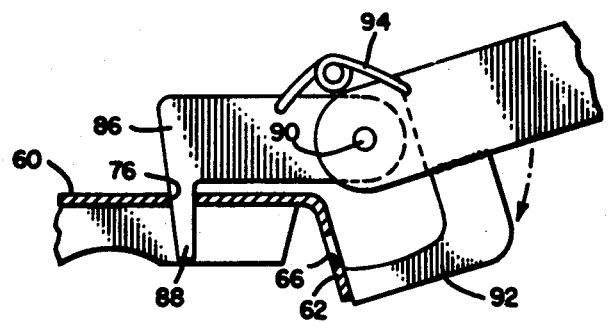
FIG. 10 is a side elevational view of a fragment of the tool and the keeper.

FIG. 10 depicts the manner in which tool 80 is used to install keeper 58. Since spring 94 biases finger 88 away from lug 92, there is normally sufficient clearance for the tool to be positioned over the corner of the keeper so that finger 88 can be inserted into, an anchored within, opening 76. Openings 76, 78, in effect, provide fulcrum points for the rotational movement of tool 80. When handle 82 is rotated in a clockwise fashion, lug 92 presses against the lower end of leg 62 below aperture 66 and forces leg 62 into a vertical orientation in which ear 16e extends through aperture 66. Tool 80 is then removed from opening 76 and is inserted into opening 78, so that the same procedure can be followed in bending leg 64 into a vertical orientation to lock the keeper onto the bracket.

As previously noted, keeper 58, as well as keeper 36, are fabricated from a malleable metal, such as steel, that takes a set and does not exhibit any resilience characteristic. Accordingly, the keeper can be removed from its locking engagement with ear 16e, 16f and reused, so long as the repeated bending of the legs does not set up stresses in the hinge line defined between the legs and the body that exceed the elastic limit of the particular malleable metal from which the keepers are fabricated. Obviously, simple manual tools may be used to install, or remove, both embodiments of the keeper from its locking engagement with the ears on the brackets.

The structural configurations of the instant one and two piece keepers, and the functional advantages attributable thereto, are susceptible of minor changes and modifications which fall within the inventive scope of this application. Consequently, it is submitted that the appended claims should not be severely limited to their literal terms, but should be accorded an interpretation commensurate with the technical advance in the useful arts and sciences to which this invention appertains.

I claim:

1. In combination, a keeper for use with an idler roll set and a manual tool for installing the keeper,
  1. said keeper comprising:
    (a) a planar body member having a first leg formed at one end thereof and a second leg formed at the opposite end thereof,
    (b) said first leg having a first aperture defined therein and said second leg having a second aperture defined therein,
    (c) said first aperture in said first leg adapted to be forced over a first projection on a bracket and said second aperture in said second leg adapted to be forced over a second projection on a bracket,
    (d) a first flange formed at one lateral side of the body member and a second flange formed at the opposite side thereof, said flanges adapted to bear against a pair of idler rolls,
    (e) the planar body of said keeper being interrupted by a plurality of openings,
    (f) said keeper being executed in a malleable metal that takes a set and lacks any significant resilience characteristic,
  2. said tool comprising:
    (a) an elongated handle that terminates in a cavity at its forward end,
    (b) a lug joined to the handle,
    (c) an L-shaped member including a horizontally extending arm and a vertically extending finger,
    (d) a pin extending across said cavity and through said arm of the L-shaped member to secure one end of said member within the cavity of said handle,
    (e) said handles and lug being rotatable relative to said pin,
    (f) said finger being insertable into the openings in the planar body of the keeper so that said handle of the tool can be rotated to press the lug against each leg of said keeper until each aperture is forced over the projections on the bracket.

2. The combination of keeper and manual tool therefor as defined in claim 1 wherein said tool further comprises resilient means interposed between the L-shaped member and the handle, said resilient means biasing the finger away from the lug so that the tool can be positioned over the juncture of the keeper body and leg.

3. The combination of keeper and manual tool therefor as defined in claim 1 wherein said finger gradually tapers to a size smaller than the size of the openings in said keeper.

4. In combination, a keeper for use with an idler roll set and a manual tool for installing the keeper;
  a. said keeper comprising:
    (i) a body member having a first leg formed at one end thereof and a second leg formed at the opposite end thereof;
    (ii) said first leg having a first aperture defined therein and said second leg having a second aperture defined therein;
    (iii) said first aperture in said first leg adapted to be disposed over a first projection on a bracket of the idler roll set and said second aperture in said second leg adapted to be disposed over a second projection on the bracket; and
    (iv) said keeper being executed in a malleable metal that takes a set and lacks any significant resilience characteristic.
  b. said tool comprising:
    (i) a handle;
    (ii) first means carried by said handle for co-operation with a leg of said keeper; and
    (iii) second means carried by said handle for co-operation with said keeper such that as said handle is moved with respect to said keeper, and said abutment means co-operates with said leg of said keeper, said leg is bent with respect to said body until the aperture in said leg moves into its position disposed over its respective projection on the bracket.

5. The combination of claim 4, wherein:
  a. said body of said keeper is interrupted by at least one opening; and
  b. said second means carried by said handle is formed to co-operate with said opening.

6. The combination of claim 5, wherein:
  a. said body of said keeper is interrupted by a pair of openings, one opening being disposed proximate said first leg and the other opening being disposed proximate said second leg; and b. said second means carried by said handle is formed to co-operate with either of said openings.

7. The combination of claim 4, wherein said first means is a lug carried by said handle.

8. The combination of claim 4, wherein said second means is a finger carried by said handle.

9. The combination of claim 6, wherein said first means is a lug carried by said handle and said second means is a finger carried by said handle and formed for insertion in either of said openings.

10. The combination of claim 4, wherein said body member is substantially planar.

11. The combination of claim 4, wherein:
   a. first flange means are formed at one lateral side of said body member; and
   b. second flange means are formed at the opposite lateral side of said body member;
   c. said flanges being formed to co-operate with predetermined portions of a pair of idler rolls when disposed in the bracket of the idler roll set.

* * * * *